United States Patent
Otake et al.

(10) Patent No.: US 10,910,799 B2
(45) Date of Patent: Feb. 2, 2021

(54) CONNECTING DEVICE WITH CONICAL INTERFACE AND FLEXIBLE INSULATOR

(71) Applicant: Mitsubishi Electric Corporation, Chiyoda-ku (JP)

(72) Inventors: Yasutomo Otake, Chiyoda-ku (JP); Takahiro Umemoto, Chiyoda-ku (JP); Manabu Yoshimura, Chiyoda-ku (JP); Katsushi Nakada, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 266 days.

(21) Appl. No.: 16/078,485

(22) PCT Filed: Sep. 30, 2016

(86) PCT No.: PCT/JP2016/078978
§ 371 (c)(1),
(2) Date: Aug. 21, 2018

(87) PCT Pub. No.: WO2017/163467
PCT Pub. Date: Sep. 28, 2017

(65) Prior Publication Data
US 2019/0058308 A1 Feb. 21, 2019

(30) Foreign Application Priority Data
Mar. 24, 2016 (JP) .................. 2016-059323

(51) Int. Cl.
*H02B 13/02* (2006.01)
*H02B 1/20* (2006.01)
(Continued)

(52) U.S. Cl.
CPC ............ *H02B 1/20* (2013.01); *H02B 13/035* (2013.01); *H02B 13/045* (2013.01); *H01B 17/26* (2013.01);
(Continued)

(58) Field of Classification Search
CPC .......... H02B 13/01; H02B 13/02; H02B 1/20; H02B 13/035; H02B 13/045; H01B 17/26; H01B 17/56; H02G 15/08
See application file for complete search history.

(56) References Cited

U.S. PATENT DOCUMENTS 4,338,483 A * 7/1982 Euvrard ............... H02B 13/065
174/21 C
4,730,085 A * 3/1988 Hama .................... H02G 5/068
174/14 R
(Continued)

FOREIGN PATENT DOCUMENTS

JP  11262143 A * 9/1999
JP  2003-16881 A   1/2003
(Continued)

OTHER PUBLICATIONS

Muneaki Kurimoto, Masahiro Hanai, Hitoshi Okubo; Application of Functionally Grade Material for Reducing Electric Field on Electrode and Spacer Interface; IEEE Transactions of Dielectric and Electrical Insulation; Feb. 1 2010, pp. 256-263. (Year: 2010).*
(Continued)

*Primary Examiner* — Harry R Behm
(74) *Attorney, Agent, or Firm* — Xsensus LLP

(57) ABSTRACT

In a connecting device of an electrical apparatus in which a first solid insulator and a second solid insulator each molded as a solid insulator on a periphery of a center conductor are connected to each other via a flexible insulator, a high voltage electrode having an outer diameter larger than those of the center conductors is disposed in the second solid insulator, and a ground electrode having an inner diameter smaller than that of an outer ground layer of the second solid insulator and larger than the outer diameter of the high voltage electrode is disposed in the first solid insulator. Electric field directions at an interface between the first solid
(Continued)

insulator and the flexible insulator and at an interface between the second solid insulator and the flexible insulator are directions along the respective interfaces.

13 Claims, 14 Drawing Sheets

(51) Int. Cl.
    *H02B 13/045*      (2006.01)
    *H02B 13/035*      (2006.01)
    *H01B 17/26*      (2006.01)
    *H01B 17/56*      (2006.01)
    *H02G 15/08*      (2006.01)

(52) U.S. Cl.
    CPC .............. *H01B 17/56* (2013.01); *H02B 13/02* (2013.01); *H02G 15/08* (2013.01)

(56) References Cited

U.S. PATENT DOCUMENTS

| | | | |
|---|---|---|---|
| 4,786,761 A | * | 11/1988 | Hama .................. H02G 5/068 |
| | | | 174/22 C |
| 2006/0254791 A1 | * | 11/2006 | Hama .................. H01H 33/24 |
| | | | 174/22 C |
| 2018/0034251 A1 | * | 2/2018 | Umemoto ............ H02B 13/005 |

FOREIGN PATENT DOCUMENTS

| | | | |
|---|---|---|---|
| JP | 2006320196 A | * | 11/2006 |
| JP | 2010-142089 A | | 6/2010 |
| JP | 2011124041 A | * | 6/2011 |

OTHER PUBLICATIONS

International Search Report dated Jan. 10, 2017 in PCT/JP2016/078978 filed Sep. 30, 2016.

* cited by examiner

FIG.14

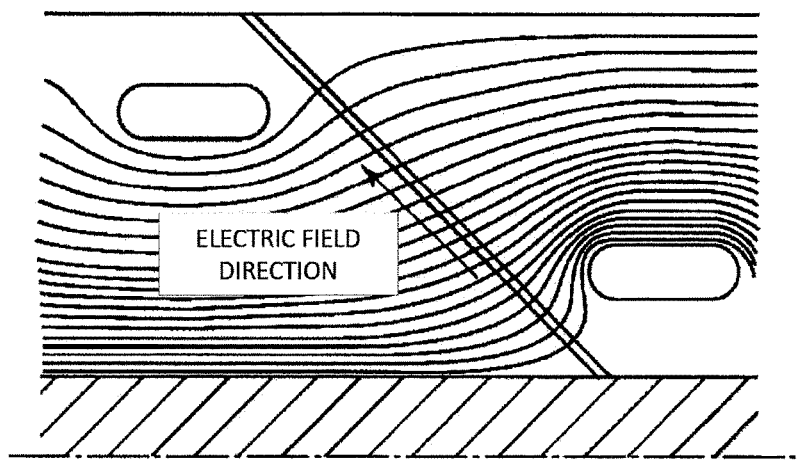

FIG.15

| ELECTRIC FIELD DIRECTION AT FLAT BUBBLE | HIGH VOLTAGE / GROUND (vertical bubble) BACKGROUND ELECTRIC FIELD DIRECTION | HIGH VOLTAGE / GROUND (horizontal bubble) BACKGROUND ELECTRIC FIELD DIRECTION |
|---|---|---|
| MULTIPLICATION FACTOR OF ELECTRIC FIELD IN BUBBLE WITH RESPECT TO BACKGROUND ELECTRIC FIELD | ONE TIME | ε TIMES |

\* ε IS RELATIVE PERMITTIVITY OF INSULATOR SURROUNDING BUBBLE
(FOR EXAMPLE, WITH EPOXY, ε = 4 )

CONNECTING DEVICE WITH CONICAL INTERFACE AND FLEXIBLE INSULATOR

TECHNICAL FIELD

The present invention relates to a connecting device of an electrical apparatus, such as a switchgear, which forms a system by connecting high voltage devices, such as a circuit breaker and a disconnector each molded with a solid insulator, to each other.

BACKGROUND ART

An electrical apparatus that forms a system by connecting high voltage devices, such as a circuit breaker, a disconnector, and a grounding switch each molded with a solid insulator typified by an epoxy resin, to each other is generally known.

Of the high voltage devices connected to each other, the high voltage device at one side has a projection shape in which a junction surface projects in a conical shape, a conductor is provided at a center portion of the high voltage device, and the outer peripheral side of the conductor is molded as a solid insulator. In addition, the high voltage device at the other side has a recess shape in which a junction surface is recessed in a conical shape, similarly, a conductor is provided at a center portion of the high voltage device, and the outer peripheral side of the conductor is molded as a solid insulator.

At the time of passing a current, a high voltage is applied to the conductor at the center side of each high voltage device. In addition, a treatment such as application of a conductive coating material is performed on the outer peripheral surface of a solid insulator that forms a mold, whereby the solid insulator is often electrically grounded.

That is, in the electrical apparatus that forms a system, insulation performance at the contact interface between the solid insulator of the high voltage device at the one side (referred to as one-side solid insulator) and the solid insulator of the high voltage device at the other side (referred to as other-side solid insulator) is important. Thus, the adhesion between the solid insulators is improved by inserting a flexible insulator such as silicone rubber into the contact interface, whereby voids or air gaps at the interface are eliminated and improvement of insulation characteristics is achieved.

However, when the flexible insulator is merely disposed, there is a problem in that the surface pressure of the flexible insulator becomes ununiform in the radial direction and partial discharge occurs at a portion where the surface pressure is low, so that the insulation characteristics deteriorate.

As an electrical apparatus that solves such a problem, there is an electrical apparatus in which a step portion is provided to a contact surface of an other-side solid insulator with a one-side solid insulator and a flexible insulator having a thickness larger than the depth of the step portion is provided at this portion, whereby the surface pressure of the flexible insulator is made uniform (see, for example, Patent Document 1).

In addition, there is also an electrical apparatus in which the thickness at the center side of a pliable insulator corresponding to the flexible insulator is made larger than the thickness at the outer diameter side of the pliable insulator and in which, when a high voltage device at one side and a high voltage device at another side are connected to each other, the surface pressure at the center side where the intensity of an electric field is high in the interface between each solid insulator and the pliable insulator is increased, thereby improving voltage withstanding performance (see, for example, Patent Document 2).

CITATION LIST

Patent Document

Patent Document 1: Japanese Laid-Open Patent Publication No. 2010-142089
Patent Document 2: Japanese Laid-Open Patent Publication No. 2003-016881

SUMMARY OF THE INVENTION

Problems to be Solved by the Invention

The electrical apparatus disclosed in Patent Document 1 has a structure in which the surface pressure of the flexible insulator after the one-side high voltage device and the other-side high voltage device are connected to each other becomes uniform at each portion. In this case, during work for connecting the one-side high voltage device and the other-side high voltage device to each other, the flexible insulator is brought into contact with each solid insulator over a range from the inner diameter side to the outer diameter side thereof at the same time, and thus bubbles cannot be removed from the connection interface and may remain therein. Immediately after the one-side high voltage device and the other-side high voltage device are connected to each other, even if bubbles remain in the interface, surface pressure is applied to the interface, so that the internal pressure of the remaining bubbles rises and deterioration of partial discharge characteristics can be reduced.

However, such a type of electrical apparatus disclosed in Patent Document 1 is operated over several decades, and has a problem in that the flexible insulator deteriorates due to the passage of time and the surface pressure at the interface decreases, resulting in a decrease in the internal pressure of bubbles remaining in advance in the interface, which leads to significant deterioration of partial discharge characteristics.

The electrical apparatus disclosed in Patent Document 2 has a structure in which the surface pressure of the pliable insulator after the one-side high voltage device and the other-side high voltage device are connected to each other is distributed such that the surface pressure at the center side is higher than that at the outer diameter side, thereby ensuring insulation performance at the center side where an electric field is high. However, the electrical apparatus disclosed in Patent Document 2 is also operated over several decades, and has a problem in that the pliable insulator deteriorates due to the passage of time and the surface pressure at the interface decreases. Thus, there is a problem in that outdoor air enters the outer diameter side where the surface pressure is relatively decreased from the initial pressure, bubbles occur in the interface, air gaps having a large size are formed in the interface of the pliable insulator with the solid insulator at the outer diameter side, and insulation performance decreases even at the outer side where an electric field is relatively low.

The present invention has been made to solve the above-described problems, and an object of the present invention is to provide an electrical apparatus that connects high voltage devices each molded with a solid insulator to each other with a flexible insulator interposed between the solid insulators, that can inhibit partial discharge from occurring in a bubble when the bubble enters the interface between the solid insulator and the flexible insulator, and that can inhibit partial discharge from occurring in a bubble or at a separation location even when the surface pressure at the interface decreases due to long-term deterioration and bubble entry or separation occurs at the interface, thereby preventing a decrease in insulation performance.

Solution to the Problems

A connecting device of an electrical apparatus according to the present invention is a connecting device of an electrical apparatus in which a projection type conical insulator and a recess type conical insulator each molded as a solid insulator on a periphery of a center conductor and provided with an outer ground layer on an outer periphery thereof are connected to each other via a flexible insulator, wherein an electric field direction at each interface formed on the projection type conical insulator and the recess type conical insulator is a direction along the interface.

Effect of the Invention

According to the present invention, since the electric field directions at the interfaces formed by the projection type conical insulator and the recess type conical insulator are directions along the interfaces, an electric field in a bubble at each interface can be reduced. Accordingly, partial discharge can be inhibited from occurring in a bubble, and thus insulation performance can be improved.

BRIEF DESCRIPTION OF THE DRAWINGS

FIG. 14 is a diagram showing isoelectric lines and an electric field direction in the connecting device of the electrical apparatus according to Embodiment 1 of the present invention.

FIG. 15 is a diagram showing the relationship between an electric field direction at a flat bubble and a multiplication factor of an electric field in the bubble with respect to a background electric field.

DESCRIPTION OF EMBODIMENTS

Figure 1:
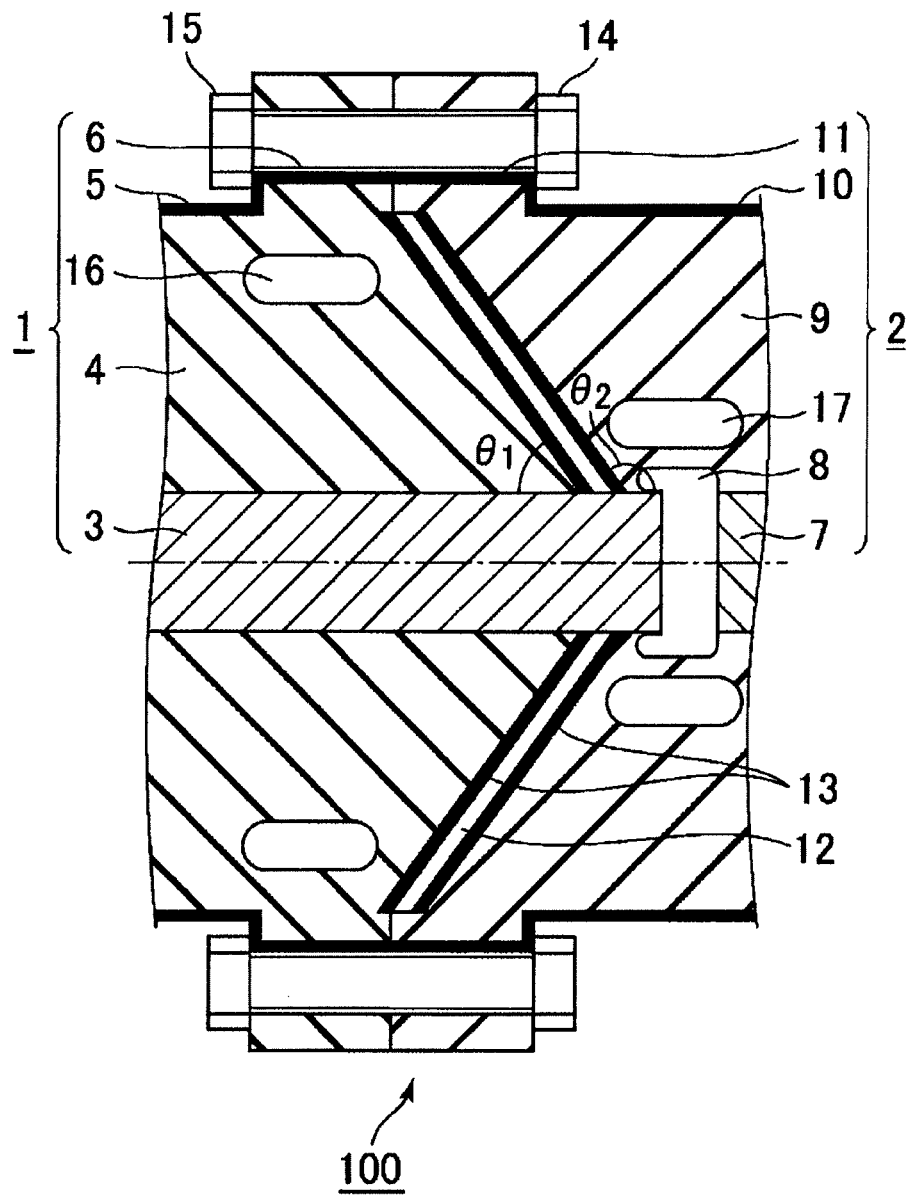
FIG. 1 is a cross-sectional view showing a connecting device of an electrical apparatus according to Embodiment 1 of the present invention.

Hereinafter, the electrical apparatus according to the present invention will be described with reference to the drawings. In the following description of embodiments, the same or corresponding components in the respective drawings are denoted by the same reference characters, and the description thereof is not repeated.

Embodiment 1

Embodiment 1 of the present invention will be described with reference to FIGS. 1 to 17. FIG. 1 is a cross-sectional view showing a connecting device of an electrical apparatus according to Embodiment 1 of the present invention. In connection of electrical devices each molded with a solid insulator, a first high voltage device 1 and a second high voltage device 2 form a connecting device 100 of the electrical apparatus.

The first high voltage device 1 is provided with a first center conductor 3 to which a high voltage is applied, and a first solid insulator 4 is formed on the periphery of the first center conductor 3 by being molded from an insulating material typified by an epoxy resin such that an end portion thereof has a conical projection shape. A first outer ground layer 5 is provided on the periphery of the first solid insulator 4. Examples of the method for forming the first outer ground layer 5 include a method in which a coating material obtained by mixing carbon black into a resin is applied to the periphery of the first solid insulator 4, and a method by zinc spraying.

The first high voltage device 1 has first through holes 6 used for connection with the second high voltage device 2, and the first outer ground layer 5 is formed also in the first through holes 6. The first high voltage device 1 has a projection-shaped connection interface that projects in a conical shape, and the interface angle θ1 formed by the connection interface and the center conductor of the first high voltage device 1 is less than 90 degrees.

Meanwhile, similar to the first high voltage device 1, the second high voltage device 2 is provided with a second center conductor 7 to which a high voltage is applied, and includes a contactor 8 at a contact portion with the first center conductor 3. Since the contactor 8 is interposed between the first center conductor 3 and the second center conductor 7, contact resistance is decreased and thus loss due to generation of heat is reduced. The contactor 8 is not necessarily required to obtain the advantageous effects of the present invention.

A second solid insulator 9 is formed on the peripheries of the second center conductor 7 and the contactor 8 by being molded from an insulating material typified by an epoxy resin. The second solid insulator 9 has a recess shape that is recessed in a conical shape so as to fit to the projection shape of the first solid insulator 4 that projects in a conical shape. Furthermore, a second outer ground layer 10 is provided on the periphery of the second solid insulator 9.

The second high voltage device 2 has second through holes 11 used for connection with the first high voltage device 1, and the second outer ground layer 10 is also formed in the second through holes 11. The second high voltage device 2 has a recessed shape connection interface that is recessed in a conical shape, and the interface angle θ2 formed by the connection interface and the center conductor of the second high voltage device 2 is greater than 90 degrees.

A conical flexible insulator 12 is disposed at the connection interface between the first high voltage device 1 and the second high voltage device 2. As the material of the flexible insulator 12, EP rubber or silicone rubber is often selected since such a material is inexpensive and allows the flexible insulator 12 to be worked into various shapes.

A lubricant 13 such as fluorine-based grease, silicone grease, and silicone oil is applied to the surface of the conical flexible insulator 12 before connection work. The reason for this is to facilitate work of connecting the first high voltage device 1 and the second high voltage device 2 to each other.

Connection of the first high voltage device 1 and the second high voltage device 2 is made by joining the first high voltage device 1 and the second high voltage device 2 via the flexible insulator 12 and the lubricant 13, and then tightening nuts 15 and through bolts 14 inserted through the first through holes 6 of the first high voltage device 1 and the second through holes 11 of the second high voltage device 2. When the first high voltage device 1 and the second high voltage device 2 are connected to each other by using the through bolts 14 and the nuts 15, designated surface pressure is applied to the interface between the first solid insulator 4 and the flexible insulator 12 and the interface between the second solid insulator 9 and the flexible insulator 12. After the connection of the first high voltage device 1 and the second high voltage device 2 is completed, a high voltage is applied to the first center conductor 3 and the second center conductor 7.

Meanwhile, the first outer ground layer 5 and the second outer ground layer 10 are grounded. Accordingly, the first solid insulator 4, the second solid insulator 9, the flexible insulator 12, the interface between the first solid insulator 4 and the flexible insulator 12, and the interface between the second solid insulator 9 and the flexible insulator 12, all of which are formed between the high voltage portion and the ground portion, are insulated.

In these insulation configurations, the weakest parts in terms of insulation are the contact interfaces between the solid insulators at the interface between the first solid insulator 4 and the flexible insulator 12 and the interface between the second solid insulator 9 and the flexible insulator 12. Furthermore, when a bubble remains in each interface and an air gap occurs therein, partial discharge occurs in the air gap, which becomes a factor for causing a great decrease in insulation performance.

The lubricant 13 applied to the interface between the first solid insulator 4 and the flexible insulator 12 and the interface between the second solid insulator 9 and the flexible insulator 12 can fill minute air gaps that can be formed between the flexible insulator 12 and the first solid insulator 4 or between the flexible insulator 12 and the second solid insulator 9. Although bubbles or air gaps remaining in the interface between the first solid insulator 4 and the flexible insulator 12 and the interface between the second solid insulator 9 and the flexible insulator 12 become a factor for causing partial discharge to occur, the effect of improving not only workability but also insulation performance can also be obtained by applying the lubricant 13.

By tightening the through bolts 14 and the nuts 15 at the time of connection, surface pressure is applied to the interface between the first solid insulator 4 and the flexible insulator 12 and the interface between the second solid insulator 9 and the flexible insulator 12, and elimination or compression of bubbles remaining in the respective interfaces can be achieved by the surface pressure. Furthermore, when the bubble internal pressure rises, the voltage of electric discharge within the bubble rises, whereby occurrence of partial discharge is inhibited. Thus, the surface pressure load is an important parameter for insulation performance at the connection interface. Generally, devising is made such that the interface surface pressure is evenly applied to the interface or becomes higher at a location where an electric field is higher.

The first high voltage device 1 has a ground electrode 16 between the first center conductor 3 and the first outer ground layer 5, and the second high voltage device 2 has a high voltage electrode 17 between the second center conductor 7 and the second outer ground layer 10, wherein the high voltage electrode 17 has the same electric potential as the second center conductor 7. The ground electrode 16 has an inner diameter smaller than that of the second outer ground layer 10. The high voltage electrode 17 has an outer diameter larger than that of the second center conductor 7 and smaller than the inner diameter of the ground electrode 16.

Figure 2:
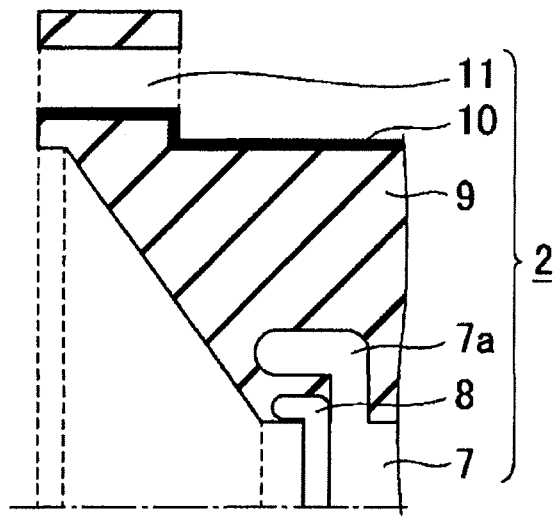
FIG. 2 is a cross-sectional view showing an example of a high voltage electrode of the connecting device of the electrical apparatus according to Embodiment 1.
Figure 3:
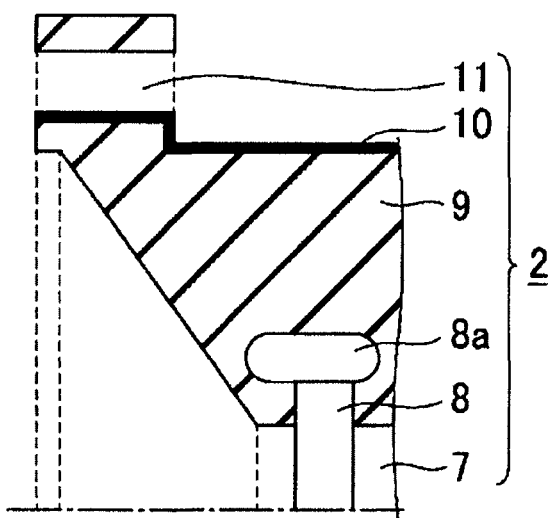
FIG. 3 is a cross-sectional view showing another configuration of the high voltage electrode of the connecting device of the electrical apparatus according to Embodiment 1.

In the present embodiment, for example, the second high voltage device 2 may have a configuration shown in FIG. 2 or FIG. 3. In the structure shown in FIG. 2, the shape of the second center conductor 7 is devised such that a flange-shaped portion 7a formed at the end of the second center conductor 7 enters the second solid insulator 9, whereby the second center conductor 7 serves as a substitute for the high voltage electrode 17. Accordingly, the high voltage electrode 17 is omitted.

In the structure shown in FIG. 3, the shape of the contactor 8 is devised such that a flange-shaped portion 8a is formed at the outer periphery of the contactor 8 and enters the second solid insulator 9, whereby the contactor 8 serves as a substitute for the high voltage electrode 17. Accordingly, the high voltage electrode 17 is omitted.

Figure 4:
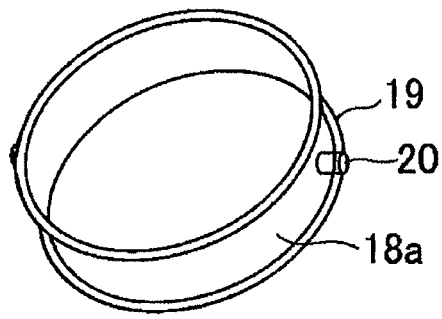
FIG. 4 is a perspective view showing a ground electrode according to Embodiment 1.
Figure 5:
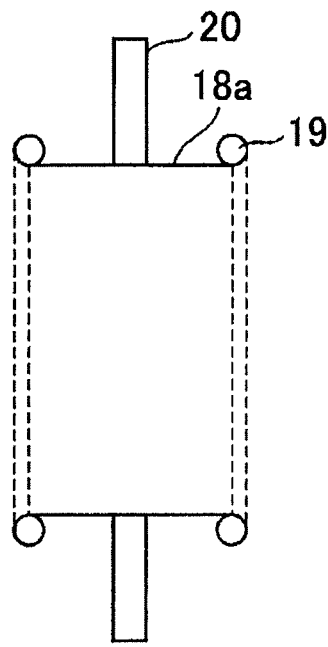
FIG. 5 is a cross-sectional view showing an example of the configuration of the ground electrode according to Embodiment 1.

The ground electrode 16 has any of the configurations shown in FIGS. 4 to 8. Generally, the ground electrode 16 includes a ground potential cylindrical metal mesh 18a, a ground potential spring-shaped helical conductor 19, and a ground potential extraction wire 20 as shown in FIG. 4. A cross-sectional view of FIG. 4 is FIG. 5. The ground potential cylindrical metal mesh 18a serves to control an electric field within the connecting device 100 of the electrical apparatus, and the ground potential spring-shaped helical conductor 19 is provided for alleviating a local electric field generated at each end portion of the ground potential cylindrical metal mesh 18a.

The ground potential extraction wire 20 is provided at one or more locations for setting the electric potential between the ground potential cylindrical metal mesh 18a and the ground potential spring-shaped helical conductor 19 at a ground potential, and is electrically connected to the second outer ground layer 10.

Figure 6:
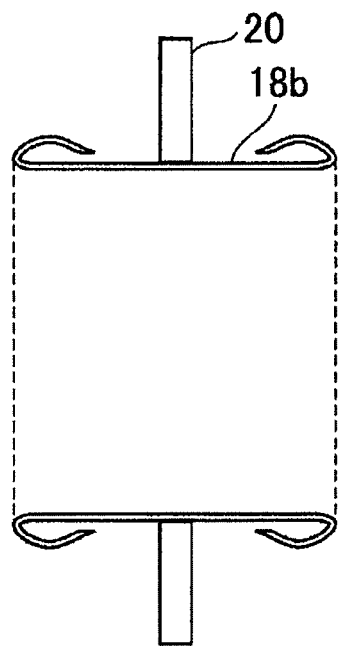
FIG. 6 is a cross-sectional view showing another configuration of the ground electrode according to Embodiment 1.
Figure 7:
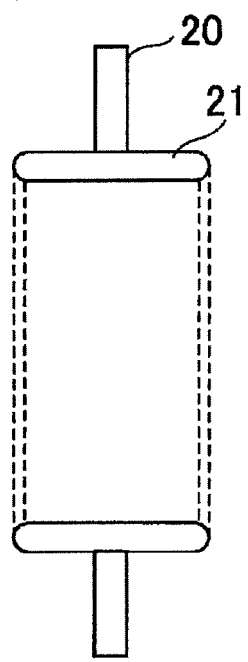
FIG. 7 is a cross-sectional view showing still another configuration of the ground electrode according to Embodiment 1.
Figure 8:
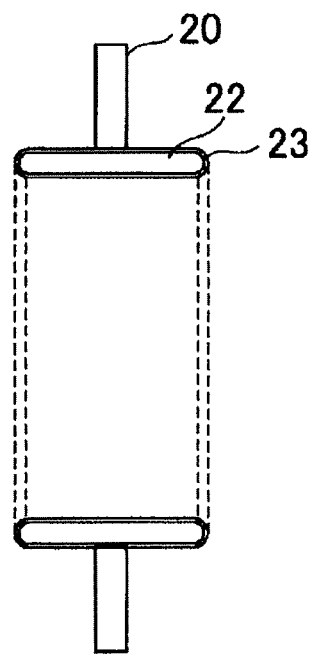
FIG. 8 is a cross-sectional view showing still another configuration of the ground electrode according to Embodiment 1.

FIGS. 6 to 8 show modifications of the ground electrode 16. In the configuration shown in FIG. 6, end portions of a ground potential cylindrical metal mesh 18b are folded back, thereby alleviating a local electric field generated at each end portion, and the ground potential spring-shaped helical conductor 19 is omitted. In the configuration shown in FIG. 7, a ground potential metal electrode 21 that is produced by cutting a metal is used, and each end portion thereof is generally formed with a curvature R such that a local electric field is prevented from being high. In the configuration shown in FIG. 8, a ground potential conductive layer 23 is provided on the surface of a ground electrode internal insulation resin 22. Here, a material that is the same as that of the first solid insulator 4 is generally used for the ground electrode internal insulation resin 22. In the configuration in FIG. 8, the electric effect is equivalent to those in the configurations in FIGS. 5 to 7.

Here, due to thermal stress generated in cooling from high-temperature curing during casting of the first high voltage device 1 or generated when the ambient temperature changes during use of the first high voltage device 1, there is a problem in that separation occurs at the interface between the first solid insulator 4 and the ground electrode 16, or a problem in that cracking occurs in the first solid insulator 4 on the surface of the ground electrode 16. In order to solve the problems, the ground electrode 16 is formed by a metal mesh and a helical conductor as in the configuration in FIG. 5, and thermal stress generated between the metal conductor and the insulation resin is alleviated.

In addition, in the configuration in FIG. 8, since the same material is used for the ground electrode internal insulation resin 22 and the first solid insulator 4, the coefficients of linear expansion of the ground electrode internal insulation resin 22 and the first solid insulator 4 are equal to each other, so that thermal stress between the metal conductor and the insulation resin described above can be significantly reduced. The material of the ground electrode internal insulation resin 22 does not have to be the same as that of the first solid insulator 4, and the material of the ground electrode internal insulation resin 22 only needs to have a coefficient of linear expansion equal to that of the first solid insulator 4.

Figure 9:
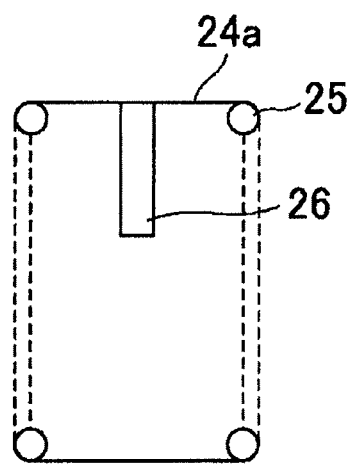
FIG. 9 is a cross-sectional view showing an example of the configuration of the high voltage electrode according to Embodiment 1.

The high voltage electrode 17 has any of the configurations shown in FIGS. 9 to 12. Generally, the high voltage electrode includes a high voltage cylindrical metal mesh 24a, a high voltage spring-shaped helical conductor 25, and a high voltage extraction wire 26 as shown in FIG. 9. The high voltage cylindrical metal mesh 24a serves to control an electric field within the connecting device 100 of the electrical apparatus, and the high voltage spring-shaped helical conductor 25 is provided for alleviating a local electric field generated at each end portion of the high voltage cylindrical metal mesh 24a. The high voltage extraction wire 26 is provided at one or more locations for setting the electric potential between the high voltage cylindrical metal mesh 24a and the high voltage spring-shaped helical conductor 25 at a high voltage, and is electrically connected to the second center conductor 7 or the contactor 8.

Figure 10:
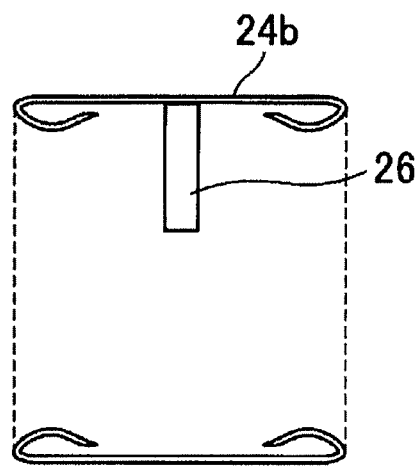
FIG. 10 is a cross-sectional view showing another configuration of the high voltage electrode according to Embodiment 1.
Figure 11:
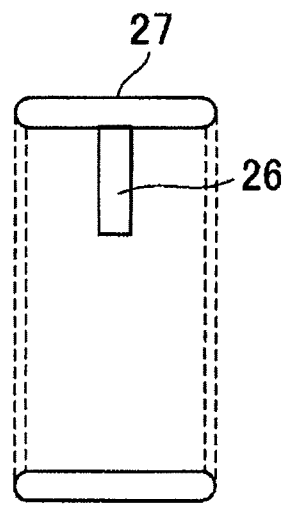
FIG. 11 is a cross-sectional view showing still another configuration of the high voltage electrode according to Embodiment 1.
Figure 12:
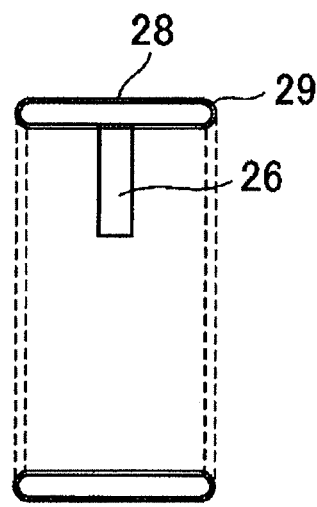
FIG. 12 is a cross-sectional view showing still another configuration of the high voltage electrode according to Embodiment 1.

FIGS. 10 to 12 show modifications of the high voltage electrode 17. In the configuration shown in FIG. 10, end portions of a high voltage cylindrical metal mesh 24b are folded back, thereby alleviating a local electric field generated at each end portion, and the high voltage spring-shaped helical conductor 25 is omitted. In the configuration shown in FIG. 11, a high voltage metal electrode 27 that is produced by cutting a metal is used, and each end portion thereof is generally formed with a curvature R such that a local electric field is prevented from being high. In the configuration shown in FIG. 12, a high voltage conductive layer 29 is provided on the surface of a high voltage electrode internal insulation resin 28. Here, a material that is the same as that of the second solid insulator 9 is generally used for the high voltage electrode internal insulation resin 28. In the configuration in FIG. 12, the electric effect is equivalent to those in the configurations in FIGS. 9 to 11.

Here, due to thermal stress generated in cooling from high-temperature curing during casting of the second high voltage device 2 or generated when the ambient temperature changes during use of the second high voltage device 2, there is a problem in that separation occurs at the interface between the second solid insulator 9 and the high voltage electrode 17, or a problem in that cracking occurs in the second solid insulator 9 on the surface of the high voltage electrode 17. In order to solve the problems, the high voltage electrode 17 is formed by a metal mesh and a helical conductor as in the configuration in FIG. 9, and thermal stress generated between the metal conductor and the insulation resin is alleviated. In addition, in the configuration in FIG. 12, since the same material is used for the high voltage electrode internal insulation resin 28 and the second solid insulator 9, the coefficients of linear expansion of the high voltage electrode internal insulation resin 28 and the second solid insulator 9 are equal to each other, so that thermal stress between the metal conductor and the insulation resin described above can be significantly reduced. The material of the high voltage electrode internal insulation resin 28 does not have to be the same as that of the second solid insulator 9, and the material of the high voltage electrode internal insulation resin 28 only needs to have a coefficient of linear expansion equal to that of the second solid insulator 9.

With the ground electrode 16 and the high voltage electrode 17, the directions of electric fields at the interface between the first solid insulator 4 and the flexible insulator 12 and the interface between the second solid insulator 9 and the flexible insulator 12 can be controlled to be parallel to the corresponding interfaces. Although the advantageous effect achieved by this will be described in detail later, partial discharge can be inhibited from occurring in a bubble remaining at each interface or at a separation location at each interface. In addition, a bubble easily remains or a space easily occurs due to dimensional errors of components, at an end portion of the interface between the first solid insulator 4 and the flexible insulator 12 and at an end portion of the interface between the second solid insulator 9 and the flexible insulator 12, but an electric field at the bubble or the space can be reduced, and inhibition of partial discharge at the end portion of each interface can also be achieved. Furthermore, at a location that is a point of contact among three different materials, the first solid insulator 4 or the second solid insulator 9, the flexible insulator 12, and the first center conductor 3 or the second center conductor 7, at the center-side end portion of the interface between the first solid insulator 4 and the flexible insulator 12 or the interface between the second solid insulator 9 and the flexible insulator 12, and at which an electric field is locally multiplied, the local high electric field can be alleviated by the high voltage electrode 17 of the second high voltage device 2.

Figure 13:
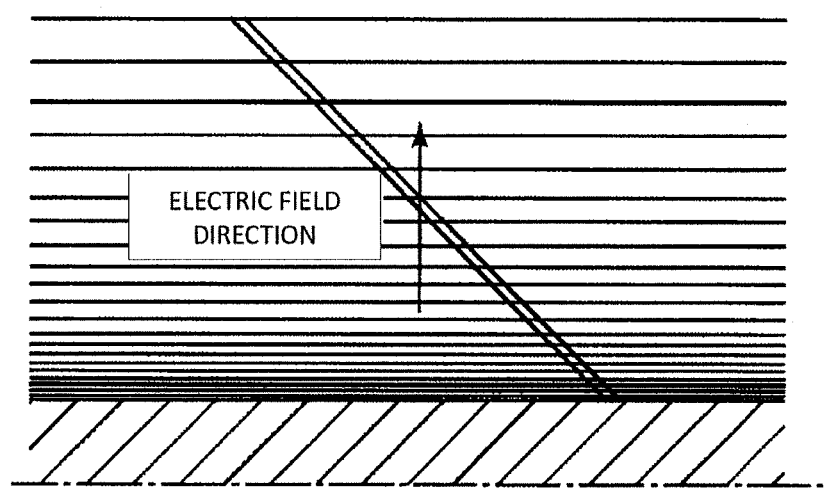
FIG. 13 is a diagram showing isoelectric lines and an electric field direction in a connecting device of an electrical apparatus on which the present invention is not carried out.

FIG. 13 is an electric field analysis result in the case where the ground electrode 16 of the first high voltage device 1 and the high voltage electrode 17 of the second high voltage device 2 are not provided, and shows isoelectric lines and an electric field direction. In addition, FIG. 14 is an electric field analysis result in the case where the ground electrode 16 of the first high voltage device 1 and the high voltage electrode 17 of the second high voltage device 2 are provided, and shows isoelectric lines and an electric field direction.

From FIGS. 13 and 14, it is found that the electric field direction at each of the interface between the first solid insulator 4 and the flexible insulator 12 and the interface between the second solid insulator 9 and the flexible insulator 12 is controlled to be a direction along the interface by the ground electrode 16 and the high voltage electrode 17.

FIG. 15 shows the relationship between an electric field direction at a flat bubble and a multiplication factor of an electric field in the bubble with respect to a background electric field. Bubbles remaining at the interface between the first solid insulator 4 and the flexible insulator 12 and the interface between the second solid insulator 9 and the flexible insulator 12 are elongated in directions along the respective interfaces to have flat shapes by interface surface pressure applied at the time of connection. At the flat bubble, when an electric field is applied so as to be orthogonal to the direction in which the flat bubble is elongated, the electric field in the bubble is multiplied by a value equal to the relative permittivity of the surrounding insulator, as compared to the background electric field at the surrounding insulator. For example, in the case where the surrounding insulator is an epoxy resin, the relative permittivity of the surrounding insulator is 4, and thus the electric field in the flat bubble is increased by about four times. Accordingly, the electric field in the bubble is multiplied from the background electric field, and partial discharge occurs since gas in the bubble has a lower electric discharge voltage than the surrounding insulator.

Figure 16:
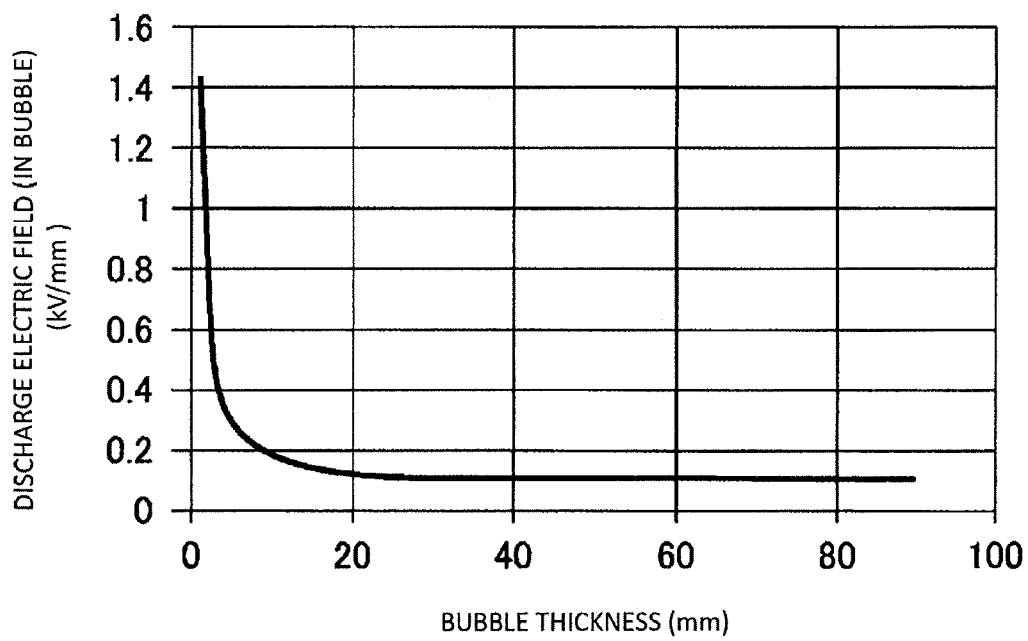
FIG. 16 is a graph showing a bubble thickness and the value of an electric field in the bubble that causes electric discharge to occur in the bubble.
Figure 17:
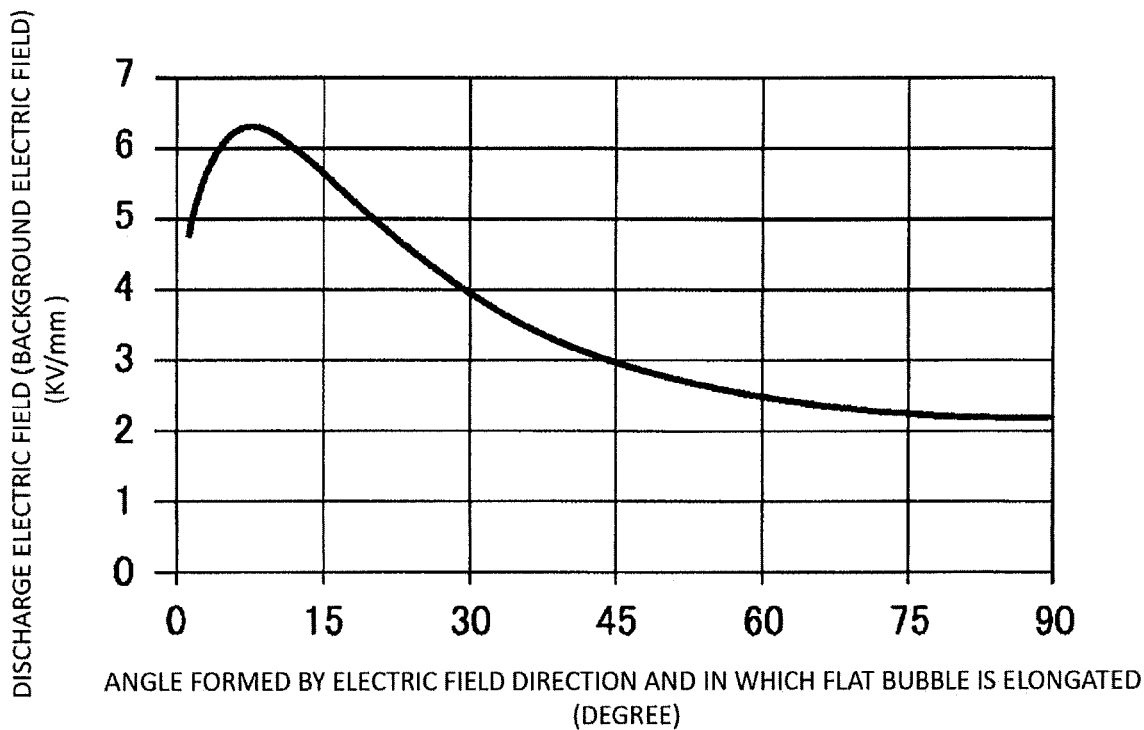
FIG. 17 is a graph showing the relationship between the angle formed between the direction in which a flat bubble extends and an electric field direction and a background electric field in a solid insulator that causes electric discharge to occur in the bubble.

Generally, the relationship between a bubble thickness and a discharge electric field in the bubble is clarified by using Paschen's law. In the case where the internal pressure of the bubble is equal to the atmospheric pressure, such a relationship is as shown in FIG. 16. The discharge electric field decreases as the bubble thickness increases. Next, FIG. 17 shows variation of a discharge electric field in a bubble when the angle formed by the electric field direction and the direction in which the flat bubble is elongated varies. This electric field is converted to a background electric field around the bubble, not the electric field in the bubble. When the angle formed by the electric field direction and the direction in which the flat bubble is elongated is changed from the orthogonal direction, that is, 90 degrees, to the parallel direction, that is, 0 degrees, the electric field in the bubble is reduced, and thus the background electric field that causes electric discharge to occur in the bubble rises. On the other hand, as the angle formed by the electric field direction and the direction in which the flat bubble is elongated decreases, the distance in the bubble for which a line of electric force extends increases, and the bubble thickness apparently increases, so that the discharge electric field slightly decreases.

Accordingly, in FIG. 17, at 7 to 8 degrees, the angle has a peak value and becomes optimum. At this time, the discharge electric field is increased by about three times as compared to that at 90 degrees. However, the optimum angle or the increase in the discharge electric field changes depending on the connection surface pressure or the permittivity of the surrounding insulation resin. Thus, the angle at which the advantageous effects of the present invention can be obtained is not limited to the parallel direction, that is, 0 degrees, and is in the range of 0 to 30 degrees, and the discharge electric field is increased by about two times.

Figure 18:
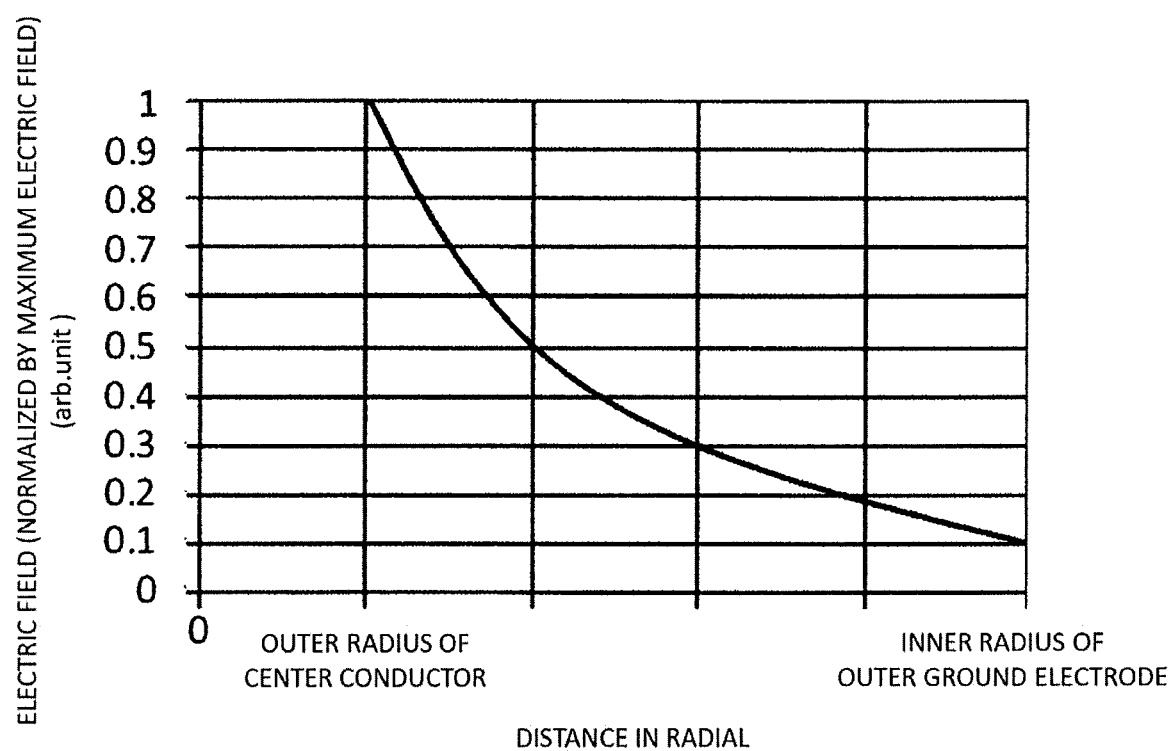
FIG. 18 is a graph showing the distribution of an electric field with respect to a radial direction in a coaxial cylindrical, electrode system.

Here, the distribution of an electric field in a coaxial cylindrical electrode system such as the first high voltage device 1 and the second high voltage device 2 will be described. FIG. 18 shows the distribution of an electric field with respect to the radial direction in the coaxial cylindrical electrode system. In FIG. 18, the horizontal axis represents the absolute value of a distance in the radial direction when the center conductor radius is set to 1, and the vertical axis represents the intensity of an electric field normalized by a maximum electric field, that is, by an electric field at the center conductor outer radius. In addition, in FIG. 18, the inner radius of the outer ground electrode is set to 5 as an example. As shown in FIG. 18, the electric field increases toward the center conductor, and decreases toward the outer ground electrode. The increase in the discharge electric field by the electric field direction control described above is required more at a location closer to the center conductor in which the electric field is high. In consideration of the fact that the effect of increasing the discharge electric field at the interface between the first solid insulator 4 and the flexible insulator 12 and the interface between the second solid insulator 9 and the flexible insulator 12 by the electric field direction control is about two times as described above, the above-described electric field direction control is required at least in a range where the electric field is not lower than half the maximum electric field. Therefore, in the case of the example in FIG. 18, the above-described electric field direction control is required in a range where the distance in the radial direction from a rotation shaft is up to twice the distance to the outer radius of the center conductor.

Due to the above, by providing the ground electrode 16 of the first high voltage device 1 and the high voltage electrode 17 of the second high voltage device 2, and controlling the electric field direction at each of the interface between the first solid insulator 4 and the flexible insulator 12 and the interface between the second solid insulator 9 and the flexible insulator 12 to the direction along the corresponding interface, partial discharge can be inhibited from occurring in a flat bubble remaining at each interface or at a separation location at each interface, and thus insulation performance can be improved.

Embodiment 2

Figure 19:
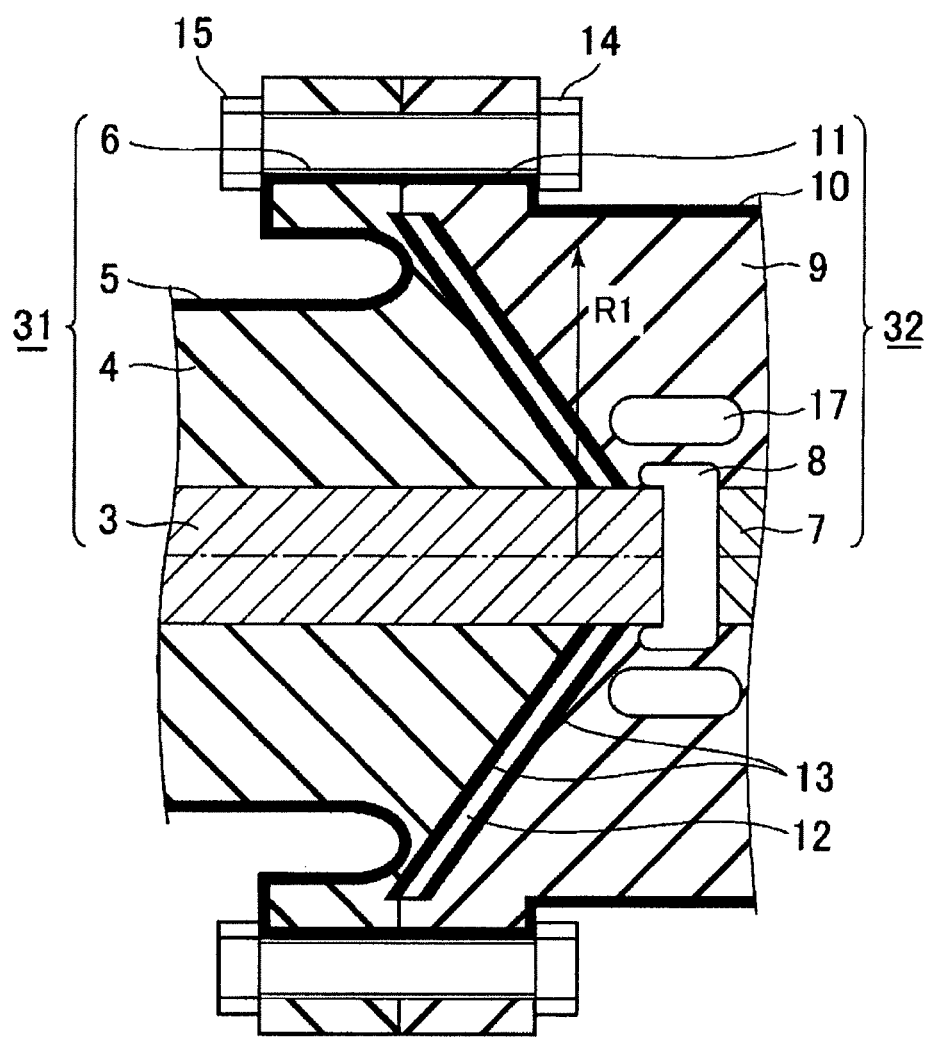
FIG. 19 is a cross-sectional view showing a connecting device of an electrical apparatus according to Embodiment 2 of the present invention.

Embodiment 2 of the present invention will be described with reference to FIGS. 19 and 20. FIG. 19 is a cross-sectional view showing a connecting device of an electrical apparatus according to Embodiment 2 of the present invention. In the present embodiment, the connecting device of the electrical apparatus is characterized by having a structure in which the high voltage electrode 17 having an outer diameter larger than that of a center conductor of a second high voltage device 32 is disposed in the second solid insulator 9 and by having a structure in which the inner diameter of the first outer ground layer 5 of a first high voltage device 31 is smaller than the inner diameter of the second outer ground layer 10 of the second high voltage device 32.

By providing the first outer ground layer 5 of the first high voltage device 31 and the high voltage electrode 17 of the second high voltage device 32, the direction of the electric field at each of the interface between the first solid insulator 4 and the flexible insulator 12 and the interface between the second solid insulator 9 and the flexible insulator 12 can be controlled to be parallel to the corresponding interface.

Figure 20:
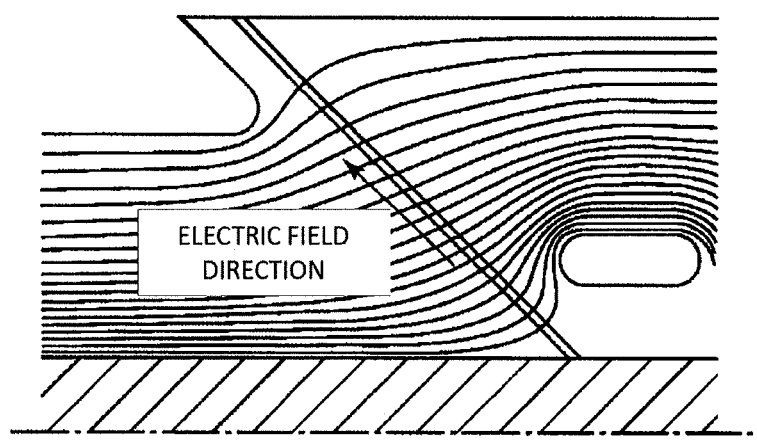
FIG. 20 is a diagram showing isoelectric lines and an electric field direction in the connecting device of the electrical apparatus according to Embodiment 2 of the present invention.

FIG. 20 is an electric field analysis result in the present embodiment and shows isoelectric lines and an electric field direction. FIG. 20 shows that the electric field direction at each of the interface between the first solid insulator 4 and the flexible insulator 12 and the interface between the second solid insulator 9 and the flexible insulator 12 is controlled to be a direction along the interface. As described above, in the case of connecting the first high voltage device 31 and the second high voltage device 32 to each other via the flexible insulator 12, an electric field at a flat bubble remaining at each of the interface between the first solid insulator 4 and the flexible insulator 12 and the interface between the second solid insulator 9 and the flexible insulator 12 or at a separation location at each interface is reduced, so that inhibition of partial discharge can be achieved. In addition, a bubble easily remains or a space easily occurs at the end portion of each interface, but an electric field at the end portion of each interface can be reduced, and inhibition of partial discharge can be similarly achieved.

Due to the above, by providing the first outer ground layer 5 of the first high voltage device 31 and the high voltage electrode 17 of the second high voltage device 32, and controlling the electric field direction at each of the interface between the first solid insulator 4 and the flexible insulator 12 and the interface between the second solid insulator 9 and the flexible insulator 12 to the direction along the corresponding interface, partial discharge can be inhibited from occurring in a flat bubble remaining at each interface or at a separation location at each interface, and thus insulation performance can be improved.

Embodiment 3

Figure 21:
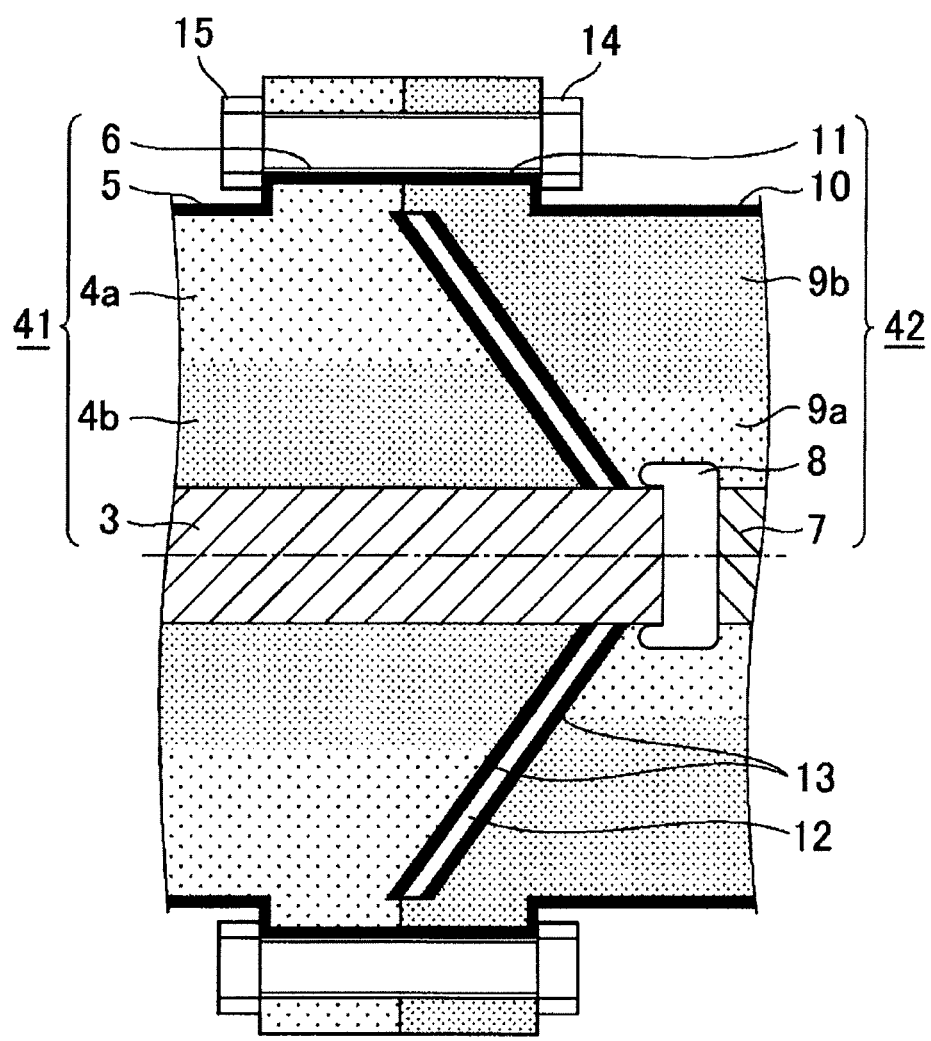
FIG. 21 is a cross-sectional view showing a connecting device of an electrical apparatus according to Embodiment 3 of the present invention.
Figure 22:
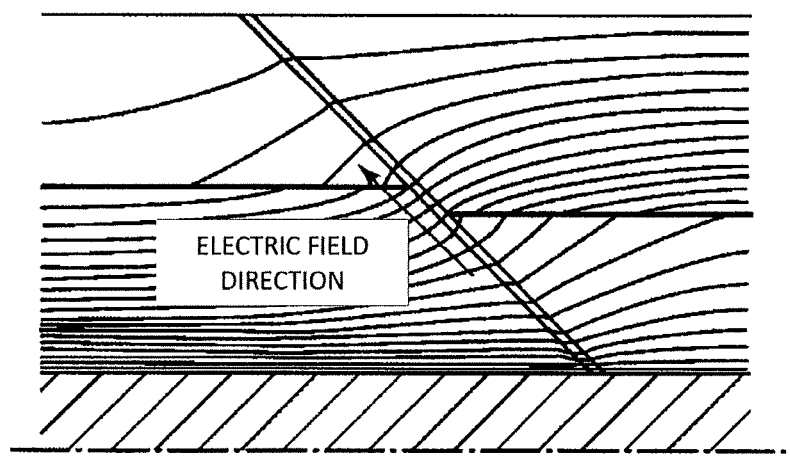
FIG. 22 is a diagram showing isoelectric lines and an electric field direction in the connecting device of the electrical apparatus according to Embodiment 3 of the present invention.

Embodiment 3 of the present invention will be described with reference to FIGS. 21 and 22. FIG. 21 is a cross-sectional view showing a connecting device of an electrical apparatus according to Embodiment 3 of the present invention. In the present embodiment, the connecting device of the electrical apparatus is characterized in that the first solid insulator 4 includes a first high permittivity insulator 4a and a first low permittivity insulator 4b and the second solid insulator 9 includes a second high permittivity insulator 9a and a second low permittivity insulator 9b, a first high voltage device 41 has a structure in which the first high permittivity insulator 4a is disposed at the outer peripheral side thereof and the first low permittivity insulator 4b is disposed at the inner peripheral side thereof, and a second high voltage device 42 has a structure in which the second high permittivity insulator 9a is disposed at the inner peripheral side thereof and the second low permittivity insulator 9b is disposed at the outer peripheral side thereof.

Due to the change in the permittivity of the insulator between at the outer periphery and the inner periphery in the first high voltage device 41 and at the second high voltage device 42, the direction of an electric field at each interface can be controlled to be parallel to the interface. FIG. 22 is an electric field analysis result in the present embodiment and shows isoelectric lines and an electric field direction.

In the case where the permittivity of the insulator between the high voltage portion and the ground potential portion has a plurality of values, the electric field is concentrated at a location where the permittivity is low, and the electric field at a location where the permittivity is high decreases. Thus, since the electric field is concentrated at the inner peripheral side, that is, at the first low permittivity insulator 4b, in the first high voltage device 41 and the electric field is concentrated at the outer peripheral side, that is, at the second low permittivity insulator 9b, in the second high voltage device 42, the electric field direction at each of the interface between the first solid insulator 4 and the flexible insulator 12 and the interface between the second solid insulator 9 and the flexible insulator 12 can be controlled to be a direction along the corresponding interface.

As described above, in the case of connecting the first high voltage device 41 and the second high voltage device 42 to each other via the flexible insulator 12, an electric field at a flat bubble remaining at each of the interface between the first solid insulator 4 and the flexible insulator 12 and the interface between the second solid insulator 9 and the flexible insulator 12 or at a separation location at each interface is reduced, so that inhibition of partial discharge can be achieved. In addition, a bubble easily remains or a space easily occurs at the end portion of each interface, but an electric field at the end portion of each interface can be reduced, and inhibition of partial discharge can be similarly achieved.

Due to the above, by controlling the electric field direction at each of the interface between the first solid insulator 4 and the flexible insulator 12 and the interface between the second solid insulator 9 and the flexible insulator 12 to the direction along the corresponding interface in the structure in which the first high permittivity insulator 4a is disposed at the outer peripheral side of the first high voltage device 41 and the first low permittivity insulator 4b is disposed at the inner peripheral side of the first high voltage device 41 and the structure in which the second high permittivity insulator 9a is disposed at the inner peripheral side of the second high voltage device 42 and the second low permittivity insulator 9b is disposed at the outer peripheral side of the second high voltage device 42, partial discharge can be inhibited from occurring in a flat bubble remaining at each interface or at a separation location at each interface, and thus insulation performance can be improved.

It is noted that, within the scope of the present invention, part or all of the above embodiments may be freely combined with each other, or each of the above embodiments may be modified or simplified as appropriate.

DESCRIPTION OF THE REFERENCE CHARACTERS 1 first high voltage device
2 second high voltage device
3 first center conductor
4 first solid insulator
4a first high permittivity insulator
4b first low permittivity insulator
5 first outer ground layer
6 first through hole
7 second center conductor
7a flange-shaped portion of second center conductor
8 contactor
8a flange-shaped portion of contactor
9 second solid insulator
9a second high permittivity insulator
9b second low permittivity insulator
10 second outer ground layer
11 second through hole
12 flexible insulator
13 lubricant
14 through bolt
15 nut
16 ground electrode
17 high voltage electrode
18a ground potential cylindrical metal mesh (without end portion processing)
18b ground potential cylindrical metal mesh (with end portion bending)
19 ground potential spring-shaped helical conductor
20 ground potential extraction wire
21 ground potential metal electrode
22 ground electrode internal insulation resin
23 ground potential conductive layer
24a high voltage cylindrical metal mesh (without end portion processing)
24b high voltage cylindrical metal mesh (with end portion bending)
25 high voltage spring-shaped helical conductor
26 high voltage extraction wire
27 high voltage metal electrode
28 high voltage electrode internal insulation resin
29 high voltage conductive layer
31 first high voltage device
32 second high voltage device
41 first high voltage device
42 second high voltage device
100 connecting device of electrical apparatus

The invention claimed is:

1. A connecting device of an electrical apparatus in which a projection type conical insulator and a recess type conical insulator each molded as a solid insulator on a periphery of a center conductor and provided with an outer ground layer on an outer periphery thereof are connected to each other via a flexible insulator, wherein
permittivities of the projection type conical insulator and of the recess type conical insulator are selected such that an electric field direction at each interface formed on the projection type conical insulator and the recess type conical insulator is a direction along the interface.

2. The connecting device of the electrical apparatus according to claim 1, wherein the electric field direction is the direction along the interface in a range, of each of the interfaces, where intensity of the electric field is not lower than half a maximum electric field between the center conductor and the outer ground layer.

3. The connecting device of the electrical apparatus according to claim 2, wherein a high voltage electrode having an outer diameter larger than that of the center conductor is disposed in the recess type conical insulator, and a ground electrode having an inner diameter smaller than that of the outer ground layer of the recess type conical insulator and larger than the outer diameter of the high voltage electrode is disposed in the projection type conical insulator.

4. The connecting device of the electrical apparatus according to claim 2, wherein a high voltage electrode having an outer diameter larger than that of the center conductor is disposed in the recess type conical insulator, and the outer ground layer of the projection type conical insulator has an inner diameter smaller than that of the outer ground layer of the recess type conical insulator.

5. The connecting device of the electrical apparatus according to claim 2, wherein an inner peripheral side of the projection type conical insulator is composed of a low permittivity insulator and an outer peripheral side of the projection type conical insulator is composed of a high permittivity insulator, and an inner peripheral side of the recess type conical insulator is composed of a high permittivity insulator and an outer peripheral side of the recess type conical insulator is composed of a low permittivity insulator.

6. A connecting device of an electrical apparatus, comprising a first center conductor, a second center conductor, a projection type conical first solid insulator disposed on an outer periphery of the first center conductor, a recess type conical second solid insulator disposed on an outer periphery of the second center conductor, outer ground layers provided on respective outer peripheries of the first solid insulator and the second solid insulator, and a flexible insulator disposed between the first solid insulator and the second solid insulator, the first center conductor and the second center conductor being connected to each other by tightening the first solid insulator and the second solid insulator, wherein
a high voltage electrode is disposed in the second solid insulator and at an outer peripheral side with respect to the center conductor, and a ground electrode is disposed in the first solid insulator, at an inner peripheral side with respect to the outer ground layer, and at an outer peripheral side with respect to the high voltage electrode.

7. The connecting device of the electrical apparatus according to claim 6, wherein an end portion of the second center conductor is formed in a flange shape and disposed in the second solid insulator.

8. The connecting device of the electrical apparatus according to claim 6, wherein the first center conductor and the second center conductor are connected to each other via a contactor.

9. The connecting device of the electrical apparatus according to claim 8, wherein an end portion of the contactor is formed in a flange shape and disposed in the second solid insulator.

10. The connecting device of the electrical apparatus according to claim 6, wherein the ground electrode includes a ground potential cylindrical metal mesh for controlling an electric field, a member for alleviating a local electric field generated at an end portion of the ground potential cylindrical metal mesh, and a ground potential extraction wire.

11. The connecting device of the electrical apparatus according to claim 6, wherein the high voltage electrode includes a high voltage cylindrical metal mesh for controlling an electric field in the connecting device of the electrical apparatus, a member for alleviating a local electric field generated at an end portion of the high voltage cylindrical metal mesh, and a high voltage extraction wire for setting an electric potential of the high voltage cylindrical metal mesh at a high voltage.

12. A connecting device of an electrical apparatus, comprising a first center conductor, a second center conductor, a projection type conical first solid insulator disposed on an outer periphery of the first center conductor, a recess type conical second solid insulator disposed on an outer periphery of the second center conductor, outer ground layers provided on respective outer peripheries of the first solid insulator and the second solid insulator, and a flexible insulator disposed between the first solid insulator and the second solid insulator, the first center conductor and the second center conductor being connected to each other by tightening the first solid insulator and the second solid insulator, wherein a high voltage electrode having an outer diameter larger than that of the second center conductor is disposed in the second solid insulator, and the outer ground layer of the first solid insulator has an inner diameter smaller than that of the outer ground layer of the second solid insulator.

13. A connecting device of an electrical apparatus, comprising a first center conductor, a second center conductor, a projection type conical first solid insulator disposed on an outer periphery of the first center conductor, a recess type conical second solid insulator disposed on an outer periphery of the second center conductor, outer ground layers provided on respective outer peripheries of the first solid insulator and the second solid insulator, and a flexible insulator disposed between the first solid insulator and the second solid insulator, the first center conductor and the second center conductor being connected to each other by tightening the first solid insulator and the second solid insulator, wherein an inner peripheral side of the first solid insulator is composed of a low permittivity insulator and an outer peripheral side of the first solid insulator is composed of a high permittivity insulator, and an inner peripheral side of the second solid insulator is composed of a high permittivity insulator and an outer peripheral side of the second solid insulator is composed of a low permittivity insulator.

* * * * *